(12) United States Patent
Hazin et al.

(10) Patent No.: US 12,344,698 B2
(45) Date of Patent: Jul. 1, 2025

(54) MODIFIED STYRENIC RESINS THROUGH HYDROGENATION

(71) Applicant: SABIC GLOBAL TECHNOLOGIES B.V., Bergen Op Zoom (NL)

(72) Inventors: Paulette Hazin, Bangalore (IN); Kaiwalya Sabnis, Bangalore (IN); Reginald Tennyson, Bangalore (IN); Travis Conant, Bangalore (IN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 18/869,578

(22) PCT Filed: Jul. 13, 2023

(86) PCT No.: PCT/EP2023/069448
§ 371 (c)(1),
(2) Date: Nov. 26, 2024

(87) PCT Pub. No.: WO2024/028071
PCT Pub. Date: Feb. 8, 2024

(65) Prior Publication Data
US 2025/0163193 A1 May 22, 2025

(30) Foreign Application Priority Data
Aug. 2, 2022 (EP) .................................. 22188288

(51) Int. Cl.
*C08F 8/04* (2006.01)
*C08F 112/08* (2006.01)
(52) U.S. Cl.
CPC .............. *C08F 8/04* (2013.01); *C08F 112/08* (2013.01)

(58) Field of Classification Search
USPC ...................................... 525/333.3, 338, 940
See application file for complete search history.

(56) References Cited

U.S. PATENT DOCUMENTS

| 3,607,989 A | 9/1971 | Sonnabend | |
|---|---|---|---|
| 6,806,322 B2 * | 10/2004 | Hashizume | .......... G11B 7/2533 528/502 A |

FOREIGN PATENT DOCUMENTS

| CN | 102481559 A | 5/2012 |
|---|---|---|
| CN | 111253507 A | 6/2020 |

(Continued)

OTHER PUBLICATIONS

International Search Report and Written Opinion issued in Corresponding PCT Application No. PCT/EP2023/069448, mailed Oct. 11, 2023.

(Continued)

*Primary Examiner* — Fred M Teskin
(74) *Attorney, Agent, or Firm* — NORTON ROSE FULBRIGHT US LLP

(57) ABSTRACT

Methods for the hydrogenation of aromatic-containing polymers are described. A method includes hydrogenation of polymers by contacting a polymer solution that includes an aromatic-containing polymer and a mixture of a non-polar solvent and a polar solvent having a dielectric constant greater than 7.6 at 25° C. and a non-polar solvent having a dielectric constant of 5 or less at 25° C. with a hydrogenation catalyst to produce polymer composition that includes at least one hydrogenated and/or at least one partially hydrogenated aromatic ring. The polar to non-polar solvent volume ratio ranges from 10:90 to 80:20.

19 Claims, 4 Drawing Sheets

(56) References Cited

FOREIGN PATENT DOCUMENTS

| | | |
|---|---|---|
| EP | 1042374 | 10/2000 |
| EP | 1834965 | 9/2007 |
| GB | 933127 | 8/1963 |
| JP | H11286515 A | 10/1999 |
| KR | 20090058239 A | 6/2009 |
| WO | WO 2022/013751 | 1/2022 |

OTHER PUBLICATIONS

CN office action issued on Apr. 3, 2025 for Chinese Application No. 202380042023.6.

* cited by examiner

MODIFIED STYRENIC RESINS THROUGH HYDROGENATION

CROSS REFERENCE TO RELATED APPLICATIONS

The present application is a national phase application under 35 U.S.C. § 371 of International Application No. PCT/EP2023/069448, filed Jul. 13, 2023, which claims the benefit of priority to European Patent Application No. 22188288.9, filed Aug. 2, 2022, each of which are incorporated herein by reference in their entirety.

BACKGROUND OF THE INVENTION

A. Field of the Invention

The invention generally concerns methods for the hydrogenation of aromatic-containing polymers using a solvent system that includes a mixture of a non-polar solvent and a polar solvent. The polar solvent has a dielectric constant greater than 7.6 at 25° C.

B. Description of Related Art

Hydrogenation of aromatic-containing polymers into saturated ones can improve their physical properties, such as thermal and mechanical properties, and oxidative stability. Homogeneous and heterogeneous catalysts can be used for this hydrogenation process. Compared to homogeneous catalysts, heterogeneous catalysts offer the advantage of separation from the polymer solutions. Heterogeneous catalytic hydrogenation of aromatic-containing polymers (e.g., polystyrene) can be carried out in a solution phase using a heterogeneous (solid) platinum (Pt) catalyst that is supported on an oxide, carbonate, or sulfate (e.g., $Al_2O_3$, $SiO_2$, $TiO_2$, $CaCO_3$, $BaSO_4$ etc.) support. The catalyst can be dispersed in a hydrocarbon solvent such as cyclohexane or decahydronaphthalene (decalin). However, heterogeneous catalyst processes suffer from the low reaction rates due to mass transfer limitations caused by steric hindrances of the bulky and long polymer chains. This can result in inaccessibility of polymer molecules to the catalytic active sites.

To avoid the mass transfer limitation, bimetallic catalysts dispersed in various solvents have been described. For example, Chinese Patent Application Publication No. 109482170 describes hydrogenating polystyrene by dispersing a supported bimetallic catalyst in a solution of tetrahydrofuran and hexamethylene. However, this process suffers in that the catalyst requires use of a templated support material, which can increase production costs and/or complexity. European Patent No 1042374 to Wege et al. describes the use of polar solvents such as ethers that do not an alpha-hydrogen atom adjacent to the ether function (e.g., methyl-t-butyl ether) with solvents suitable for hydrogenation reactions in the presence of nickel catalysts. However, this process suffers from limited catalyst life. U.S. Pat. No. 3,607,989 to Sonnabend describes hydrogenating polystyrene in an equal amount of 1,2-dichloroethane to obtain hydrogenated polystyrene, which is insoluble in the 1,2-dichloroethane.

Although heterogeneous catalysis processes are known, challenges still remain to reduce reaction time and increase cost-effectiveness.

SUMMARY OF THE INVENTION

A discovery has been made that provides a solution to at least one or more of the problems associated with hydrogenation of aromatic-containing polymers using a heterogeneous catalytic system. In one aspect, a solution includes use of a solvent system (e.g., a mixture of solvents) that includes a polar solvent and a non-polar solvent. The polar solvent is any solvent having a dielectric constant greater than 7.6 at 25° C. and is stable under hydrogenation conditions. A non-polar solvent is any solvent having a dielectric constant less than 5 at 25° C. and is stable under hydrogenation conditions. The ratio of polar solvent to non-polar solvent ranges from 10:90 to 80:20. An advantage of using this type of solvent system can be enhancement of the hydrogenation reaction rate by as much as two-fold as compared to the same reaction using only a non-polar solvent while maintaining the solubility of the hydrogenated product. A faster reaction rate can provide advantages such as reduction of batch time for producing hydrogenated or partially hydrogenated aromatic-containing polymers, and enhancement of the production rate at the same time. Notably, the resulting hydrogenated product (e.g., PVCH) is solubilized in the solvent system after cooling to ambient temperatures, which provides for a more energy efficient process as the product solution does not need to be heated for transportation for downstream processing. For example, when the polymer product solution contacts, or is subjected to cooler conditions, (e.g., "cold spots") in piping that connects the hydrogenation reactor to polymer isolation equipment (such as flash chamber and de-volatilization extruder), the polymer product remains solubilized, thus, the piping is not clogged due to precipitated polymer. Furthermore using a volatile polar solvent aids in solvent removal during downstream processing. These advantages can result in an economic advantage for the production of hydrogenated or partially hydrogenation polymers (e.g., polystyrenic polymers to poly (vinylcyclohexane) (PVCH). Still further, and with respect to PVCH, the resulting PVCH can be a fully aliphatic, amorphous polymer with high thermal resistance ($T_g=145°$ C.), high thermo-oxidative resistance, high resistance against polar chemicals, and/or high resistance against UV and gamma radiation.

Methods of hydrogenation of aromatic-containing polymers are described. A method includes contacting an aromatic-containing polymer solution with a hydrogenation catalyst in the presence of hydrogen ($H_2$) gas under conditions sufficient to produce a polymer composition that includes at least one hydrogenated and/or at least one partially hydrogenated aromatic ring (e.g., PVCH). The aromatic-containing polymer solution includes an aromatic-containing polymer, a polar solvent having a dielectric constant greater than 7.6 at 25° C. and a non-polar solvent. In a preferred aspect, the aromatic-containing polymer is polystyrene resin, and the hydrogenated or partially hydrogenated polymer includes poly(vinylcyclohexane). Non-limiting examples, of the non-polar solvent include cyclohexane, methylcyclohexane, ethylcyclohexane, cyclooctane, cycloheptane, dodecane, isopentane, decahydronaphthalene, or a mixture thereof. The polar solvent has a dielectric constant between 7.6 and 11 at 25° C., (e.g., 7.6, 7.7, 7.8, 7.9, 8.0, 8.1, 8.2, 8.3, 8.4, 8.5, 8.6, 8.7, 8.8, 8.9, 9.0, 9.1, 9.2, 9.3 9.4, 9.5. 9.6, 9.7, 9.8, 9.9, 10, 10.1, 10.2, 10.3, 10.4, 10.5, 10.6, 10.7, 10.8, 10.9, and 11 at 25° C.). In a preferred aspect, the polar solvent has a dielectric constant of 9 at 25° C. Non-limiting examples of the polar solvent include dichloromethane, 1,2-dichloroethane, or a blend thereof. In a preferred aspect, the non-polar solvent is cyclohexane, and the polar solvent is dichloromethane. A volume ratio of polar solvent to non-polar solvent ranges from 10:90 to 80:20, preferably 30:70 to 70:30 In some aspects, it has also been discovered that including too much of polar solvent (e.g., above 30% by volume) leads to diminishing returns. For example, using higher than 30% by vol. may not lead to a further significant increase in the hydrogenation rate. In some aspects, a hydrogenation rate of reaction is increased by a factor of greater than 1, preferably 2, more preferably 2.5, or even more preferably 5, as compared to a hydrogenation rate of reaction using under the same reaction conditions without the polar solvent. Contacting conditions include a temperature of 100° C. to 220° C., a pressure of 3.4 MPa to 7 MPa, or a combination thereof. Under these conditions, the aromatic-containing polymer is fully solubilized or at least partially solubilized in the solvent. The polymer concentration in the polymer solution is 5 wt. % to 20 wt. %, preferably 8 wt. %. Hydrogenation of the aromatic-containing polymer results in a hydrogenated or partially hydrogenated polymer composition that can be free or substantially free of polymer scission compositions. In some aspects, the hydrogenation catalyst includes platinum (Pt), palladium (Pd), ruthenium (Ru), or any combination thereof, or alloy thereof. The hydrogenation catalyst can include a support (e.g., silica ($SiO_2$), alumina ($Al_2O_3$), or titania ($TiO_2$), or any combination thereof). The hydrogenation process can be a heterogeneous catalytic hydrogenation process as the catalyst can be dispersed or suspended in the solvent.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions of the invention can be used to achieve methods of the invention.

The following includes definitions of various terms and phrases used throughout this specification.

The term "aromatic-containing polymer" refers to a polymer, copolymer, or block polymer and the like having at least one aromatic ring. Non-limiting examples of polymers are polystyrene, polymethylstyrene, and copolymers of styrene and at least one other monomer such as α-methylstyrene, butadiene, isoprene, acrylonitrile, methyl acrylate, methyl methacrylate, maleic anhydride, and/or olefins (e.g., ethylene or propylene). Examples of suitable copolymers include those formed from acrylonitrile, butadiene and styrene, copolymers of acrylic esters, styrene and acrylonitrile, copolymers of styrene and α-methylstyrene, and copolymers of propylene, diene and styrene, aromatic polyethers, particularly polyphenylene oxide, aromatic polycarbonates, aromatic polyesters, aromatic polyamides, polyphenylenes, polyxylylenes, polyphenylene vinylenes, polyphenylene ethinylenes, polyphenylene sulfides, polyaryl ether ketones, aromatic polysulfones, aromatic polyether sulphones, aromatic polyimides and mixtures thereof, and optionally copolymers with aliphatic compounds also. Suitable substituents in the phenyl ring include C1-C4 alkyl groups, such as methyl or ethyl, C1-C4 alkoxy groups such as methoxy or ethoxy, and/or aromatic entities which are condensed thereon and which are bonded to the phenyl ring via a carbon atom or via two carbon atoms, including phenyl, biphenyl and naphthyl. Suitable substituents on the vinyl group include C1-C4 alkyl groups such as methyl, ethyl, or n- or iso-propyl, particularly methyl in the α-position. Suitable olefinic comonomers include ethylene, propylene, isoprene, isobutylene, butadiene, cyclohexadiene, cyclohexene, cyclopentadiene, norbornenes which are optionally substituted, dicyclopentadienes which are optionally substituted, tetracyclododecenes which are optionally substituted, dihydrocyclopentadienes, derivatives of maleic acid, preferably maleic anhydride, and derivatives of acrylonitrile, preferably acrylonitrile and methacrylonitrile.

The aromatic-containing polymers can have (weight average) molecular weights Mw from 1000 to 10,000,000, preferably from 60,000 to 1,000,000, most preferably from 70,000 to 600,000, particularly from 100,000 to 300,000, as determined by gel permeation chromatography (GPC) equipped with light scattering, refractive index, and UV detectors.

The aromatic-containing polymers can have a linear chain structure or can have branching locations due to co-units (e.g., graft copolymers). The branching centers can include star-shaped or branched polymers, or can include other geometric forms of the primary, secondary, tertiary, or optionally of the quaternary polymer structure. Copolymers can be random copolymers or alternatively block copolymers. Block copolymers include di-blocks, tri-blocks, multi-blocks, and star-shaped block copolymers.

The phrase "hydrogenation activity" refers to a measured rate of polymer hydrogenation in the unit of moles of aromatic rings per hour per gram of catalytic metal at a specific reaction temperature, pressure, and/or polymer concentration.

The term "nanoparticles" means particles that exist on the nanometer (nm) scale with the diameter between 1 nm and 1000 nm.

The term "non-polar" solvent refers to a solvent that has a dielectric constant of less than 5 (See, for example, Brown et al., in "Organic Chemistry" 8 ed., 2018, pgs. 389-390) and stable to hydrogenation conditions. Non-limiting examples of non-polar solvents include cyclohexane, methylcyclohexane, ethylcyclohexane, cyclooctane, cycloheptane, dodecane, isopentane, decahydronaphthalene, or a mixture thereof.

The term "polar" solvent refers to a solvent that has a dielectric constant of greater than 7.6 and stable to hydrogenation conditions. Non-limiting examples of polar solvents include dichloromethane, 1,2-dichloroethane, or mixtures thereof.

The term "stable to hydrogenation" refers to a composition (e.g., aromatic solvents) that does not react with hydrogen at 100° C. to 220° C. and a pressure of 3.4 MPa to 7 MPa.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the methods of the present invention are their abilities to enhance the rate of hydrogenation of aromatic-containing polymers to produce fully hydrogenated or partially hydrogenated aromatic-containing polymers. This can be done with substantially none or no polymer scission of the hydrogenated or partially hydrogenated polymers.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
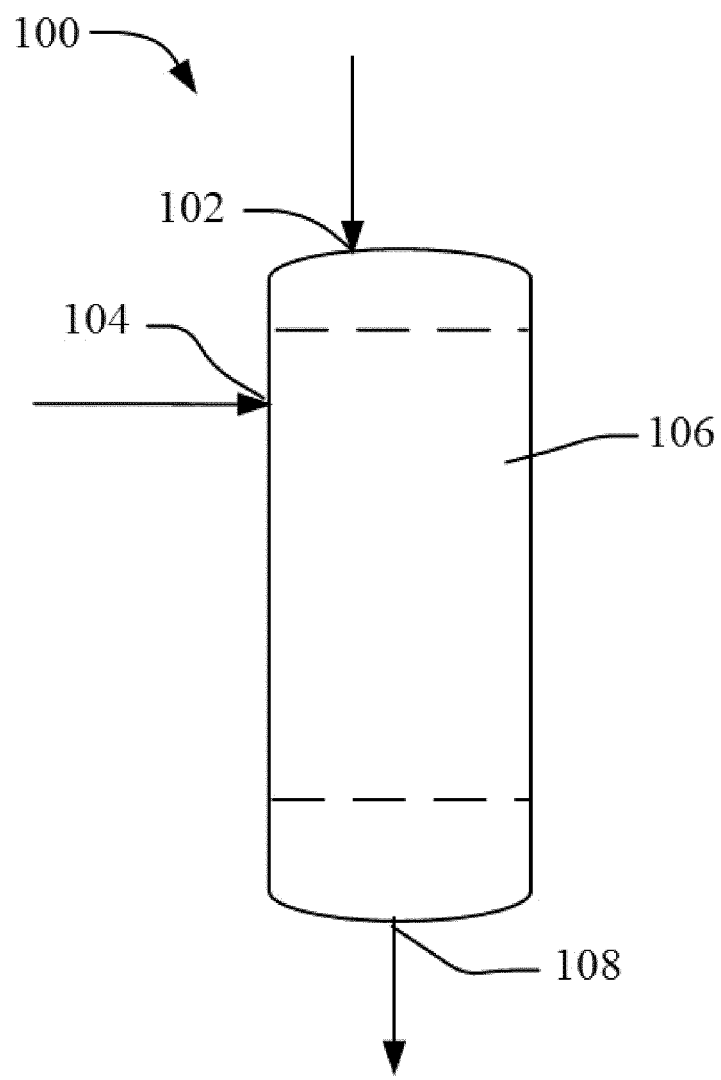
FIG. 1 is an illustration of a reactor system to produce hydrogenated or partially hydrogenated aromatic-containing polymers using the solvent systems of the present invention.

While the invention is susceptible to various modifications and alternative forms, specific embodiments thereof are shown by way of example in the drawings. The drawings may not be to scale.

DETAILED DESCRIPTION OF THE INVENTION

At least one solution to some of the problems associated with hydrogenating aromatic-containing polymers has been discovered. The solution includes a cost-effective solvent system that can increase production of hydrogenated aromatic-containing polymers. The solvent system includes a polar solvent having a dielectric constant of at least 7.6 at 25° C. and a non-polar solvent having a dielectric constant of less than 5 at 25° C. in a polar to non-polar solvent volume ratio of 10:90 to 80:20. Without wishing to be bound by theory, it is believed that the addition of a polar solvent increases mass transfer between the catalyst and the polymer, while the non-polar solvent solubilizes the hydrogenated product so that the hydrogenated product does not precipitate from solution upon cooling the reaction mixture.

These and other non-limiting aspects of the present invention are discussed in further detail in the following sections.

A. Solvent System

The solvent system of the present invention includes a polar solvent and a non-polar solvent. The polar solvent has a dielectric constant of at least 7.6 at at 25° C., preferably 7.6 to 11 at 25° C. Non-limiting examples of dielectric constant values include 7.6, 7.7, 7.8, 7.9, 8.0, 8.1, 8.2, 8.3, 8.4, 8.5, 8.6, 8.7, 8.8, 8.9, 9.0, 9.1, 9.2, 9.3 9.4, 9.5, 9.6, 9.7, 9.8, 9.9, 10.0, 10.1, 10.2, 10.3, 10.4, 10.5, 10.6, 10.7, 10.8, 10.9, 11.0, and any values or ranges there between. Non-limiting examples of polar solvents include dichloromethane and 1,2-dichloroethane. Dichloromethane has a dielectric constant of 8.93 at 25° C. 1,2-Dichloroethane has a dielectric constant of 10.36 at 25° C. The polar solvent does not include tetrahydrofuran or methyltetrahydrofuran. Non-limiting examples of non-polar solvents include cyclohexane, methylcyclohexane, ethylcyclohexane, cyclooctane, cycloheptane, dodecane, isopentane, decahydronaphthalene, or a mixture thereof. A volume ratio of polar to non-polar solvent include 10:90 to 80:20, or 10:90, 20:80, 30:70, 40:60, 50:50, 60:40, 70:30, 80:20 or any value or range there between. The solvent system includes any mixture of the non-polar and polar solvents as long as the volume ratio of non-polar to polar solvent is maintained and/or the polar solvent has a dielectric constant greater than 7.6 at 25° C. Non-limiting examples of a two solvent system includes a mixture of dichloromethane and cyclohexane, a mixture of dichloromethane and methylcyclohexane, a mixture of dichloromethane and ethylcyclohexane, a mixture of dichloromethane and cyclooctane, a mixture of dichloromethane and cycloheptane, a mixture of dichloromethane and dodecane, a mixture of dichloromethane and isopentane, or a mixture of dichloromethane and decahydronaphthalene. In another example, the solvent system includes a mixture of 1,2-dichloroethane and cyclohexane, a mixture of 1,2-dichloroethane and methylcyclohexane, a mixture of 1,2-dichloroethane and ethylcyclohexane, a mixture of 1,2-dichloroethane and cyclooctane, a mixture of 1,2-dichloroethane and cycloheptane, a mixture of 1,2-dichloroethane and dodecane, a mixture of 1,2-dichloroethane and isopentane, or a mixture of 1,2- dichloroethane and decahydronaphthalene. Other solvent combinations (e.g., 3, 4, 5 6, 7, 8, 9, 10, 15, 20 solvent combinations and the like) are also within the scope of this invention. Using the solvent system of the present invention, the hydrogenation rate of reaction can be increased by a factor of greater than 1, 2, 2.5, 3, 3.5, 4, 4.5, 5, or greater as compared to a hydrogenation rate of reaction of the same reaction using only the non-polar solvent. The solvent system of the present invention fully solubilizes, or at least partially solubilize the aromatic-containing polymer, the hydrogenated aromatic-containing polymer, the partially hydrogenated aromatic-containing polymer, or combinations thereof. The solvent system does not include solvents that are not stable to hydrogenation reactions. For example, aromatic solvents such as benzene, toluene, naphthalenes, xylenes, or mixtures thereof. In general, a polymer concentration in the solvent system of the present invention ranges from 5 wt. % to 20 wt. %, or 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. % or any range or value there between.

B. Methods of Hydrogenating Aromatic-Containing Polymers

FIG. 1 depicts a schematic for a process for the hydrogenation of an aromatic-containing polymer using the solvent system of the present invention. In some aspects, the process is a heterogeneous reaction. Reactor 100 can include inlet 102 for a polymer reactant feed, inlet 104 for $H_2$ reactant feed, reaction zone 106 that is configured to be in fluid communication with the inlets 102 and 104, and outlet 108. Outlet 108 can be configured to be in fluid communication with the reaction zone 106 and configured to remove the product stream from the reaction zone. Reactor 100 can be any reactor suitable for performing polymer hydrogenations (e.g., a batch reactor or continuous reactor). The reaction zone 106 can include any catalyst capable of hydrogenation of aromatic-containing polymers. The polymer reactant feed can enter the reaction zone 106 via the inlet 102. The reactant feed can be a mixture of a solvent system of the present invention and an aromatic-containing polymer. In one aspect, the solvent system is dichloromethane and cyclohexane, and the aromatic-containing polymer is a polystyrenic resin. A mass ratio of solvent to polymer can be 4:1, 9:1, 19:1 or any range or value there between. The $H_2$ reactant feed can enter reactor 100 after purging the reactor with nitrogen via inlet 104. In reaction zone 106, the hydrogenation catalyst can be dispersed in the solvent system and the aromatic-containing polymer can be fully solubilized or at least partially solubilized in the solvent system. The pressure of reactor 100 can be maintained with the $H_2$ reactant feed. The product stream can be removed from the reaction zone 106 via product outlet 108. The product stream can be sent to other processing units, stored, and/or be transported. The product stream includes at least one hydrogenated, at least one partially hydrogenated aromatic ring, or both, or mixtures thereof. For example, polystyrene can be hydrogenated to produce poly(vinylcyclohexane). The produced polymer product is absent lower molecular weight polymers due to polymer scission. The hydrogenation activity can be at least 10 moles of aromatic rings per hour per gram of catalytic metal (e.g., Pt, Pd, and/or Ru) at the reaction temperature of 120° C. to 140° C., pressure of 6.9 MPa, and polymer concentration of 8 wt. %. Hydrogenation levels can be at least 90%, 91%, 92%, 93%, 94%, 95%, 96%, 97%, 98%, 99%, or 100%, or any range or value there between.

The temperature and pressure can be varied depending on the reaction to be performed. Temperatures can range from 100° C. to about 220° C., 120° C. to 190° C., 150° C. to 180° C., 190° C., 200° C., 210° C., or 220° C., or any value or range there between. Pressure (e.g., $H_2$ pressure) can range from about 2.1 MPa to 7 MPa, 3.45 MPa to 7 MPa or 2.1, 2.5, 3.0, 3.1, 3.2, 3.3, 3.4, 3.45, 3.5, 3.6, 3.7, 3.8, 3.9, 4.0, 4.1, 4.2, 4.3, 4.5, 5.0, 5.5, 6.0, 6.5, 7.0 or any range or value there between. Pressure of the reaction can be maintained by the hydrogen pressure.

Reactor 100 can include one or more heating and/or cooling devices (e.g., insulation, electrical heaters, jacketed heat exchangers) or controllers (e.g., computers, flow valves, automated values, etc.) that can be used to control the reaction temperature and pressure of the reaction mixture. While only one reactor is shown, it should be understood that multiple reactors can be housed in one unit, or a plurality of reactors housed in one reactor unit. In some embodiments, a series of physically separated reactors with interstage cooling/heating devices, including heat exchangers, furnaces, fired heaters, and the like can be used.

C. Catalysts

Catalysts of the present invention can include commercial catalysts capable of catalyzing hydrogenation of an aromatic-containing polymer. Non-limiting examples of catalysts include Sigma-Aldrich® (USA), Unicat (USA), BASF (Germany), Johnson Matthey (Great Britain), Evonik (Germany), Clariant (Switzerland), and the like. The catalyst include one or more catalytic metals. In some aspects, the catalyst includes platinum (Pt), palladium (Pd), ruthenium (Ru), rhodium (Rd), or any combination thereof. In some embodiments, the catalyst is a bimetallic or trimetallic catalyst. A bimetallic catalyst can include Pt, Pd, Ru, Rd, in combination with nickel (Ni), iridium (Ir), iron (Fe), copper (Cu), silver (Ag) metals or a combination thereof. The catalyst can be supported or unsupported. Non-limiting examples of supports include silica ($SiO_2$), alumina ($Al_2O_3$), or titania ($TiO_2$), or any combination thereof. In some aspects, the catalyst is a $Pt/Al_2O_3$, $Pt/SiO_2$, or $Pt/Al_2O_3$ catalyst. A total weight percentage of metal in a supported catalyst can range from 40 wt. % to 50 wt. %, or 41 wt. %, 42 wt. %, 43 wt. %, 44 wt. %, 45 wt. %, 46 wt. %, 47 wt. %, 48 wt. %, 49 wt. %, or 50 wt. %.

In one embodiment, the catalyst can include, based on the total weight of the catalyst, 0.05 wt. % to 0.9 wt. % of Pt nanoparticles and 99.1 wt. % to 99.95 wt. % of $TiO_2$, 0.20 wt. % to 0.60 wt. % of Pt nanoparticles and 99.4 wt. % to 99.8 wt. % of $TiO_2$, or 0.25 wt. % to 0.50 wt. % of Pt nanoparticles and 99.5 wt. % to 99.75 wt. % of $TiO_2$. Such a catalyst has a pore volume of 0.01 $cm^3/g$ to 0.35 $cm^3/g$, preferably 0.03 $cm^3/g$ to 0.30 $cm^3/g$, more preferably 0.05 $cm^3/g$ to 0.25 $cm^3/g$, a surface area of 5 $m^2/g$ to 80 $m^2/g$, preferably 5 $m^2/g$ to 40 $m^2/g$, more preferably 5 $m^2/g$ to 20 $m^2/g$, and/or a median pore diameter of less than 300 microns, preferably less than 100 microns.

In one embodiment, the catalyst includes, based on the total weight of the catalyst, 0.05 wt. % to 0.9 wt. % of Pt nanoparticles and 99.1 wt. % to 99.95 wt. % of $SiO_2$, 0.20 wt. % to 0.60 wt. % of Pt nanoparticles and 99.4 wt. % to 99.8 wt. % of $SiO_2$, or 0.25 wt. % to 0.50 wt. % of Pt nanoparticles and 99.5 wt. % to 99.75 wt. % of $SiO_2$. Such a catalyst has a pore volume of 0.01 $cm^3/g$ to 0.35 $cm^3/g$, preferably 0.03 $cm^3/g$ to 0.30 $cm^3/g$, more preferably 0.05 $cm^3/g$ to 0.25 $cm^3/g$, a surface area of 5 $m^2/g$ to $80^2/g$, preferably 5 $m^2/g$ to 40 $m^2/g$, more preferably 5 $m^2/g$ to 20 $m^2/g$, and/or a median pore diameter of less than 300 microns, preferably less than 100 microns.

In one embodiment, the catalyst includes, based on the total weight of the catalyst, 0.05 wt. % to 0.9 wt. % of Pt nanoparticles and 99.1 wt. % to 99.95 wt. % of $Al_2O_3$, 0.20 wt. % to 0.60 wt. % of Pt nanoparticles and 99.4 wt. % to 99.8 wt. % of $Al_2O_3$, or 0.25 wt. % to 0.50 wt. % of Pt nanoparticles and 99.5 wt. % to 99.75 wt. % of $Al_2O_3$. Such a catalyst has a pore volume of 0.01 $cm^3/g$ to 0.35 $cm^3/g$, preferably 0.03 $cm^3/g$ to 0.30 $cm^3/g$, more preferably 0.05 $cm^3/g$ to 0.25 $cm^3/g$, a surface area of 5 $m^2/g$ to 80 $m^2/g$, preferably 5 $m^2/g$ to 40 $m^2/g$, more preferably 5 $m^2/g$ to 20 $m^2/g$, and/or a median pore diameter of less than 300 microns, preferably less than 100 microns.

EXAMPLES

The present invention will be described in greater detail by way of specific examples. The following examples are offered for illustrative purposes only and are not intended to limit the invention in any manner. Those of skill in the art will readily recognize a variety of noncritical parameters which can be changed or modified to yield essentially the same results.

Examples 1-5

(Hydrogenation of Polystyrene Using the Solvent System of the Present Invention)

A Pt/$Al_2O_3$ catalyst prepared according to International Publication No. WO 2022/013751 to Wu et al., (0.45 wt. % Pt, polystyrene to catalyst ratio of 10:1) was placed in a stainless reactor (Parr Series 5000 Multiple Reactor System, Parr Instrument Company, 100 mL) together with the desired volume of cyclohexane and dichloromethane listed in Table 1 (total volume 30 mL, solvent) and polystyrene (PS-155, SABIC® (Saudi Arabia), weight-average molecular weight $M_w$=235,000, 8 wt. %). The reactor was purged first with $N_2$ for three times, and then with $H_2$ three times to remove air and moisture and the charged with high-pressure $H_2$ to the desired reaction pressure, about 500 and 1000 psi (3.4 MPa to 6.9 MPa). After the desired pressure has been reached the reactor content was heated to a set temperature of 120° C., at a rate of 1° C./min, and maintain at the final set temperature for hours. After the reaction finished, the reactor was cooled to room temperature, the pressure discharged to atmospheric pressure (101 kPa), the contents in the reactor recovered, and the solid catalysts was separated from the polymer solution using centrifugation or filtration. The time to reach 100% conversion was 1 hour.

TABLE 1

| Example No. | Dichloromethane (vol. %) | Cyclohexane (vol. %) | Reaction time (hours) | PVCH solubility* |
|---|---|---|---|---|
| 1 | 1% | 99% | 2.66 | Yes |
| 2 | 30% | 70% | 1.57 | Yes |
| 3 | 50% | 50% | 1.56 | Yes |
| 4 | 75% | 25% | 1.36 | Yes |
| 5 | 100% | 0% | 1.27 | No |

*yes - product is soluble at 25° C.; no-product is partially or completely insoluble at 25° C.

Examples 6-10

(Hydrogenation of Polystyrene Using the Solvent System of the Present Invention)

The procedure of Example 1 was used except the reaction temperature was increased to 140° C. and a desired volume ratio of cyclohexane and dichloromethane was used. Table 2 summarizes the amounts of dichloromethane and cyclohexane used and the time to reach 100% conversion and produce poly(vinylcyclohexane) (PVCH).

TABLE 2

| Example No. | Dichloromethane (vol. %) | Cyclohexane (vol. %) | Reaction time (hours) | PVCH solubility* |
|---|---|---|---|---|
| 6 | 1% | 99% | 1.28 | Yes |
| 7 | 5% | 95% | 1.26 | Yes |
| 8 | 10% | 90% | 1.18 | Yes |
| 9 | 20% | 80% | 1.06 | Yes |
| 10 | 30% | 70% | 0.99 | Yes |
| 11 | 50% | 50% | 0.86 | Yes |
| 12 | 75% | 25% | 0.81 | Yes |
| 13 | 80% | 20% | ND | Yes |
| 14 | 90% | 10% | ND | No |
| 15 | 100% | 0% | 0.78 | No |

Figure 2:
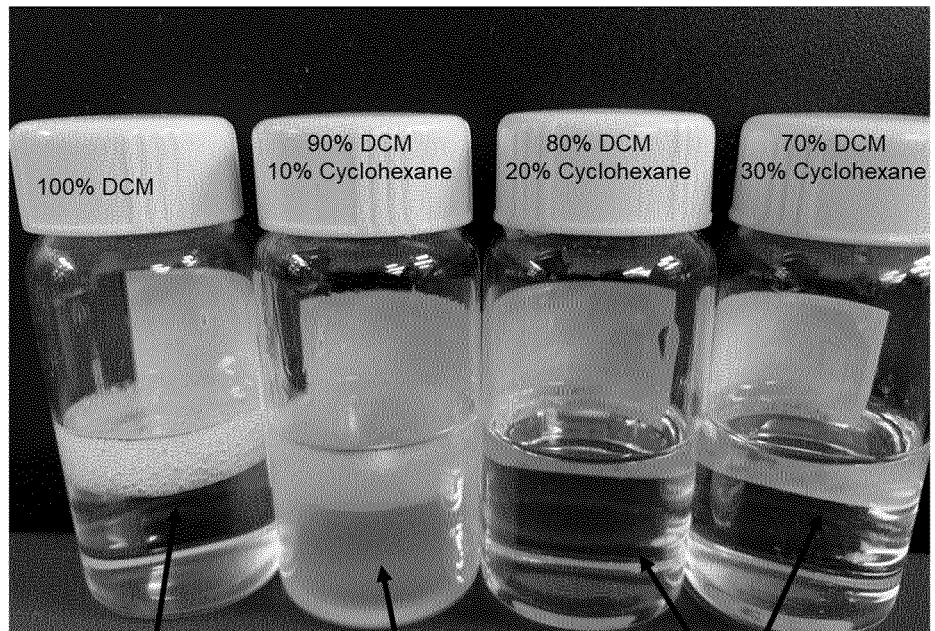
FIG. 2 are pictures showing solubility of PVCH in the solvent system of the present invention and 100% dichloromethane.
Figure 2:
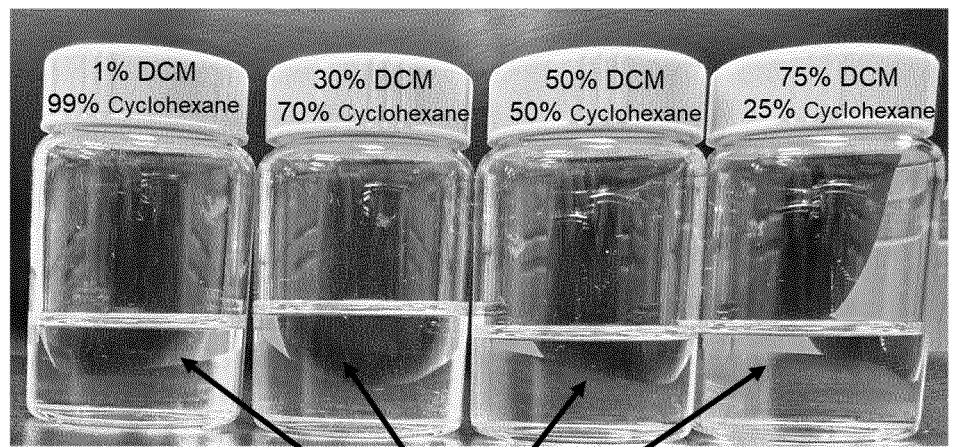

*yes - product is soluble at 25° C.; no-product is partially or completely insoluble at 25° C.
ND = not determined The solubility of PVCH reported for Examples 13 and 14 were determined by physical blending PVCH with dichloromethane and cyclohexane at the indicated volume percentages. Based on the data from Examples 12 and 15, one skilled in the art of hydrogenation would expect the reaction time to be similar to Examples 12 and 15. As shown in FIG. 2 and Tables 1 and 2, the solubility of the PVCH product was a function of the solvent composition. It was observed that the product PVCH was insoluble in 100% DCM solvent once the reaction mixture was cooled to room temperature. Referring to FIG. 2, when the DCM solvent concentration exceeded 80% by volume, the PVCH product became insoluble when cooled to near or at ambient temperature.

Comparative Example A (Hydrogenation of Polystyrene Using Cyclohexane)

The procedure of Example 1 was followed with the exception that cyclohexane was used as the solvent (i.e., no polar solvent was used). In Comparative Example A the polystyrene conversion was 100% after 3.28 hours at 120° C.

Comparative Example B (Hydrogenation of Polystyrene Using Cyclohexane)

The procedure of Examples 6-10 were followed with the exception that cyclohexane was used as the solvent (i.e., no polar solvent was used). In Comparative Example B the polystyrene conversion was 100% after 1.33 hours at 140° C.

Figure 3:
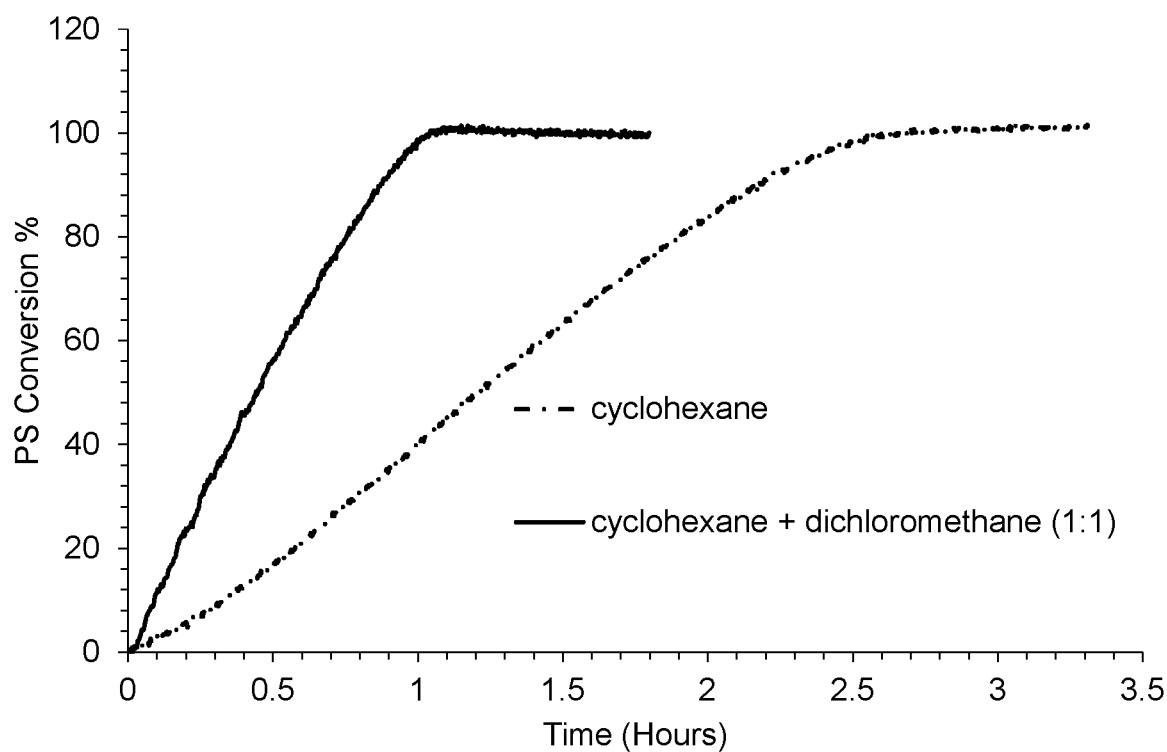
FIG. 3 is an illustration of heterogeneous catalytic hydrogenation rates of polystyrene (PS) with cyclohexane as a comparative solvent and a solvent mixture of the present invention that include 1:1 cyclohexane and dichloromethane (DCM) (by volume). Both solutions included 8 wt. % polymer, 0.45 wt. % Pt/Al$_2$O$_3$ catalyst, 10:1 PS:catalyst ratio, 120° C., 1000 psig (6.98 MPa).

FIG. 3 are graphs of the hydrogenation rates of Example 3 and the Comparative Example A. The top line is the hydrogenation polystyrene conversion (PS conversion %) versus time for the cyclohexane/dichloromethane solvent system of Example 3. The bottom line is the hydrogenation polystyrene conversion (PS conversion %) versus time for the Comparative Example A, which only used cyclohexane as the solvent. As shown in FIG. 2, a significant increase in reaction rate (i.e., a significant decrease (2.1 times) in the time to reach 100% conversion) was observed when the solvent system of the present invention (e.g., Example 3 using 1:1 volume ratio of cyclohexane and dichloromethane) for the polystyrene hydrogenation process as compared to using cyclohexane (Comparative Example B). Notably, the increased activity allowed for the hydrogenation reaction using the solvent system of the present invention to be completed in less than two hours at a temperature of 120° C.

Figure 4:
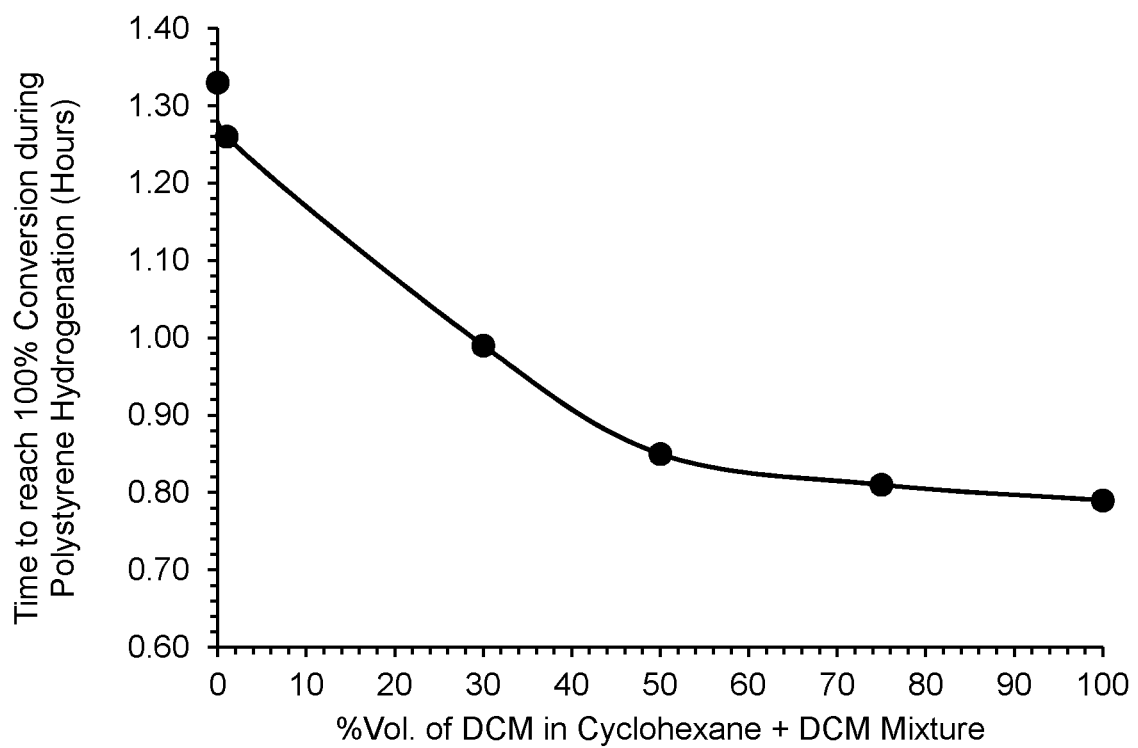
FIG. 4 is an illustration of the time to reach 100% conversion during heterogeneous catalytic hydrogenation of PS as a function of dichloromethane concentration (8 wt. % polymer, 0.45 wt. % Pt/Al$_2$O$_3$ catalyst, 10:1 PS:catalyst ratio, 140° C., 1000 psig (6.98 (MPa)).

FIG. 4 illustrates the dependence of time to achieve 100% conversion of polystyrene to PVCH during the hydrogenation process based on the volumetric concentration of dichloromethane in the solvent system of the present invention (cyclohexane and dichloromethane mixture) at 140° C. A steep drop from 1.33 hours at 0 vol. % dichloromethane (pure cyclohexane, Comparative Example B) to 0.85 hours at 50 vol. % dichloromethane (Example 8) was observed. Notably, the increased activity allowed for the hydrogenation reaction using the solvent system of the present invention to be completed in less than one hour at a temperature of 140° C.

Although embodiments of the present application and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A method for the hydrogenation of an aromatic containing polymer, the method comprising contacting an aromatic polymer solution with a hydrogenation catalyst in the presence of hydrogen ($H_2$) gas at a temperature of 100° C. to 220° C., a pressure of 3.4 MPa to 7 MPa, or a combination thereof to produce a polymer composition comprising at least one hydrogenated and/or at least one partially hydrogenated aromatic ring, wherein the aromatic polymer solution comprises an aromatic containing polymer, a polar solvent having a dielectric constant greater than 7.6 at 25° C., and a non-polar solvent having a dielectric constant of less than 5 at 25° C., wherein the volume ratio of polar to non-polar solvent ranges from 10:90 to 80:20.

2. The method of claim 1, wherein the aromatic containing polymer is a polystyrene and the hydrogenated or partially hydrogenated polymer comprises poly (vinylcyclohexane).

3. The method of claim 1, wherein the non-polar solvent is cyclohexane, methylcyclohexane, ethylcyclohexane, cyclooctane, cycloheptane, dodecane, isopentane, decahydronaphthalene, or a mixture thereof.

4. The method of claim 1, wherein the polar solvent has a dielectric constant between 7.6 and 11.

5. The method of claim 1, wherein the polar solvent is dichloromethane, 1,2-dichloroethane, or a combination thereof.

6. The method of claim 1, wherein the non-polar solvent is cyclohexane, and the polar solvent is dichloromethane.

7. The method of claim 1, wherein a volume ratio of polar solvent to non-polar solvent is 20:80 to 80:20.

8. The method of claim 1, wherein a hydrogenation rate of reaction is increased by a factor of greater than 1 as compared to a hydrogenation rate of reaction using under the same reaction conditions without the polar solvent.

9. The method of claim 1, wherein contacting conditions comprise a temperature of 120° C. to 140° C., and pressure of 3.4 MPa to 6.9 MPa.

10. The method of claim 1, wherein the hydrogenation catalyst comprises platinum (Pt), palladium (Pd), ruthenium (Ru), or any combination thereof, or alloy thereof.

11. The method of claim 1, wherein the hydrogenation catalyst comprises a support.

12. The method of claim 11, wherein the support comprises silica ($SiO_2$), alumina ($Al_2O_3$), or titania ($TiO_2$), or any combination thereof.

13. The method of claim 1, wherein the hydrogenated or partially hydrogenated polymer composition is free or substantially free of polymer scission compositions.

14. The method of claim 1, wherein the aromatic polymer is fully solubilized in the solvent.

15. The method of claim 1, wherein the polymer concentration in the polymer solution is 5 wt. % to 20 wt. %.

16. The method of claim 1, wherein a volume ratio of polar solvent to non-polar solvent is 30:70 to 70:30.

17. The method of claim 1, wherein a hydrogenation rate of reaction is increased by a factor of 5 as compared to a hydrogenation rate of reaction using under the same reaction conditions without the polar solvent.

18. The method of claim 1, wherein the aromatic polymer is at least partially solubilized in the solvent.

19. The method of claim 1, wherein the polymer concentration in the polymer solution is 8 wt. %.

* * * * *